United States Patent [19]

Sears et al.

[11] Patent Number: 4,818,922
[45] Date of Patent: Apr. 4, 1989

[54] OPTICAL COMMUTATION FOR PERMANENT MAGNET MOTORS

[75] Inventors: Jerome Sears, Wyckoff; Walter Parfomak, Wallington; Walter Kluss, Clifton, all of N.J.

[73] Assignee: Allied-Signal Inc., Morris Township, Morris County, N.J.

[21] Appl. No.: 921,491

[22] Filed: Oct. 22, 1986

[51] Int. Cl.⁴ .................. H02K 29/00; G01C 19/28
[52] U.S. Cl. .................. 318/313; 318/318; 318/138; 318/254; 74/5.6 A; 74/5.7
[58] Field of Search .............. 318/254, 138, 439, 313; 310/152, 156, 45, 46, DIG. 2, DIG. 3, 67 R; 74/5 R, 5.37, 5.4, 5.46, 5.47, 5.6 A, 5.6 D, 5.6 E, 5.7

[56] References Cited

U.S. PATENT DOCUMENTS

| | | | |
|---|---|---|---|
| 2,959,060 | 11/1960 | Kunz | 74/5.6 A |
| 3,270,567 | 9/1966 | Crampton | 74/5.6 A |
| 3,301,071 | 1/1967 | Shalloway | 74/5.6 A |
| 3,304,788 | 2/1967 | Granqvist | 74/5.6 A X |
| 3,442,144 | 5/1969 | Gray | 74/5.6 A |
| 3,528,299 | 9/1970 | Volk | 74/5.6 A |
| 3,577,053 | 5/1971 | McGee | 318/138 X |
| 3,581,173 | 5/1971 | Hood | 318/254 |
| 3,706,924 | 12/1972 | Adler | 318/254 X |
| 3,832,614 | 8/1974 | Olliffe | 318/313 |
| 3,915,019 | 10/1975 | Zoltan | 74/5.6 A |
| 3,917,988 | 11/1975 | Payne | 318/138 |
| 3,924,167 | 12/1975 | Clark et al. | 318/254 |
| 4,011,487 | 3/1977 | Loomis | 318/138 |
| 4,042,863 | 8/1977 | Heide | 318/254 |
| 4,197,489 | 4/1980 | Dunn et al. | 318/138 |
| 4,228,396 | 10/1980 | Palombo et al. | 318/313 X |
| 4,266,432 | 5/1981 | Schroeder et al. | 74/5.7 |
| 4,275,343 | 6/1981 | Fulton et al. | 318/720 |
| 4,317,072 | 2/1982 | Goof et al. | 318/138 |
| 4,354,146 | 10/1982 | Tenmyo et al. | 318/313 X |
| 4,361,760 | 11/1982 | Rodgers | 74/5.6 A X |
| 4,395,669 | 7/1983 | Berna et al. | 318/318 X |
| 4,492,902 | 1/1985 | Ficken et al. | 318/254 |

Primary Examiner—William M. Shoop, Jr.
Assistant Examiner—Paul Ip
Attorney, Agent, or Firm—Howard G. Massung

[57] ABSTRACT

The present invention deals with an apparatus and method for starting and running permanent magnet motors based on angular position information using an optical commutation technique. The optical commutation technique provides rotor position information at rest and while rotating for two-phase driving of a motor having a permanent magnet rotor. The angular position information is extracted by optical detectors, consisting of a light source and an optical sensor for detecting an optical pattern formed on the gyro rotor. The optical pick off associated with one phase is used to commutate the other phase. The optically detected signal output is converted to a frequency signal which is proportional to wheel speed. The frequency signal is converted to a voltage signal which is compared to a speed command signal in a feedback loop to generate the required drive. Alternately the frequency can be inputted to a phase lock loop circuit and compared with a speed reference clock frequency to generate the required drive signal level.

7 Claims, 2 Drawing Sheets

OPTICAL COMMUTATION FOR PERMANENT MAGNET MOTORS

BACKGROUND OF THE INVENTION

1. Field of the Invention

The present invention relates to starting and driving permanent magnet motors.

2. Description of the Prior Art

Permanent magnet motors are utilized in inertial gyroscope sensing instruments where optimum efficiency, rate stability and low run-up time are required. The derive motors include a two phase stator, a permanent magnet rotor, and suitable drive circuitry to start, run-up and maintain synchronous speed. The rotor is supported by a hydrodynamic bearing wherein the spinning rotor supplies the pressurized gas for the bearing. In the prior art, permanent magnet motor starting is implemented, without feedback, in an open loop manner. Without position feedback wheel starting characteristics are indeterminate and a no-start condition could occur under adverse environmental conditions. In the prior art driving and starting of the motor is achieved via a ramped increasing frequency two-phase drive. At a suitable rotation rate, typically 5% to 10% of synchronous speed, the windings of one phase are opened and its back EMF provides a signal indicative of rotor position and speed. The other phase winding is energized as a function of this signal after the signal has been processed by suitable drive electronics. During normal operation, after starting, the motor is operated single phase.

With the conventional drive technique, the rotor pole locations must be derived from the angular rate of the rotor, and thus the rotor has to be in motion in order to determine it pole position. At rest, zero rate, no back EMF is generated and the pole locations are unknown and the polarity of the drive to the stator phases is indeterminate. Under these conditions, a no start could result or the wheel could be started in the wrong direction would be destructive to the hydrodynamic bearing wheel. Prior art apparatus required complex start/restart electronics to overcome these problems. In addition, in prior art permanent magnet drives, two modes of operation were utilized, a two-phase open loop starting mode and a single phase closed loop running mode.

The present invention eliminates the start/restart electronics and continuously operates in a two-phase closed loop drive mode. The location of the rotor poles is determined optically and is not derived from the angular rotor rate. In addition, both phases are at all times available to be driven for maximum torque.

SUMMARY OF THE INVENTION

A method and apparatus for operating a permanent magnet motor in which the position of the permanent magnet rotor is detected, both at rest and during running, and utilized to sequentially energize stator windings to start, accelerate and maintain a desired speed. The invention utilizes an optical commutation technique which provides rotor position information at rest and at all angular velocities. The rotor position information is extracted by an optical pick-off which utilizes a light source, optical sensor and an optical pattern formed on the permanent magnet rotor.

Each optical pick-off associated with the phase winding is used to commutate the other phase for sequential energizing the windings to drive the permanent magnet rotor. The optical detector signal is also converted to a signal which is proportional to the rotor wheel speed. This signal is then compared to a speed command signal. The resulting error signal is conditioned and applied to the commutating switches, whose outputs, through appropriate drive electronics, drive the permanent magnet rotor at the commanded speed.

BRIEF DESCRIPTION OF THE DRAWINGS

For a better understanding of the invention, reference may be had to the preferred embodiments exemplary thereof shown in the accompanying drawings in which.

DETAILED DESCRIPTION OF THE PREFERRED EMBODIMENTS

Figure 1:
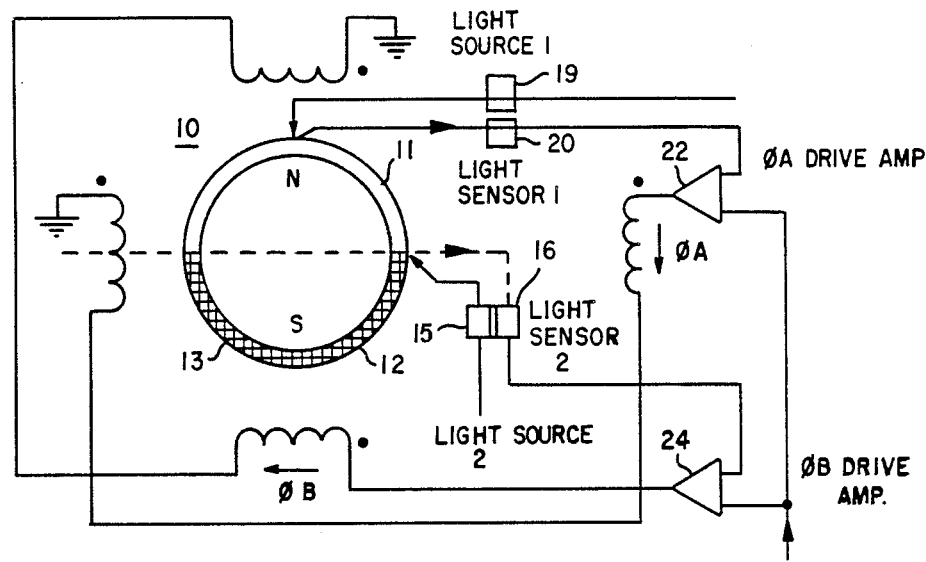
FIG. 1 is a partial schematic of a circuit for operating a permanent magnet motor according to the present invention.
Figure 2:
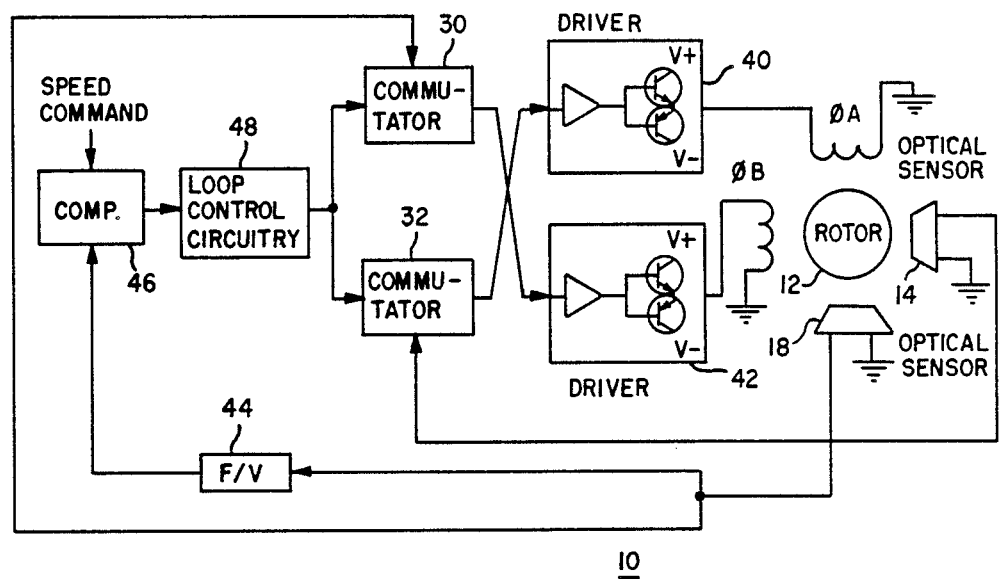
FIG. 2 is a schematic similar to FIG. 1 but including additional feedback circuitry.
Figure 3:
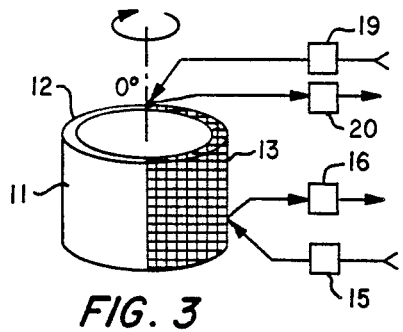
FIG. 3 shows the permanent magnet rotor and positioning of the detectors.

Referring now to the drawings and FIGS. 1 and 2 in particular there is shown a permanent magnet drive motor and control circuitry 10 for an inertial sensing instrument. The drive motor includes a permanent magnet rotor 12 and a two-phase stator having windings designated Phase A and Phase B. An optical pattern consisting of reflective and non-reflective segments is formed on gyro rotor 12. The number of reflective and non-reflective segments corresponds to the number and location of the rotor poles. Two optical sensors 14 and 18 are disposed at a separation of $180/n°$ from each other where n represents the number of motor poles, with respect to rotor 12. The motor shown has two poles and therefore, the optical sensors are separated by 90°. Each optical sensor, 14, 18, consists of a light source 15, 19 and a light sensor 16, 20, respectively. For two pole rotor 12 as shown in FIGS. 1, 2, and 3, the light sensors are separated by 90°. Each light source 15, 19 is directed on to the rotor. If the light strikes a reflective segment 11 of the optical pattern, then the associated light sensor 16, 20 will receive reflective light and be activated to produce a DC current. If the light from source 15, 19 strikes a non-reflective portion 13 of rotor 12, then the associated light sensor 16, 20 will not be activated. The DC current generated by an activated light sensor 16, 20 is squared and buffered resulting in an output which is either plus 15 volts for a reflective surface or 0 volts for a non-reflective surface.

For the embodiment shown in FIG. 1, Phase A stator winding and Phase B stator windings are split into two serially connected windings separated by 180°. When one of the serially related windings is attracting the rotor, the other is repulsing the rotor in the same direction of rotation. The output of the light sensors 16, 20 are differentially combined with a speed command reference signal by drivers 22 and 24. The output of drivers 22, 24 drive the Phase A windings or the Phase B windings to rotate rotor 12.

Referring now to FIG. 2, the outputs of optical sensors 14, 18 which represent pole locations, serve as commands to commutator switches 30 and 32. The output of commutator switches 30, 32 are fed to drivers 40, 42, respectively. In a manner well known in the art, drivers 40, 42 drive their associated stator windings for Phase A and Phase B. As the rotor 12 of permanent magnet motor 10 accelerates from rest, the output from the optical sensor buffers is a square wave whose frequency is proportional to wheel speed. The output of either detector 14 or 18 can be used to generate a DC voltage by a frequency to voltage converter 44. The resulting DC voltage, which is proportional to rotor speed, is fed to a comparator 46 and is compared with a DC speed command signal. The error signal generator at the output of comparator 46 is fed to loop control circuitry 48 where it is integrated to provide velocity and position feedback information. The velocity and position feedback is amplitude and phased adjusted to compensate for the wheel dynamics. The conditioned signal from loop control circuitry 48 is then fed to both commutator switches 30, 32 whose outputs feed the drivers 40, 42. The operation of motor 10 always stays in a two-phase mode providing maximum torque capability.

Figure 4:
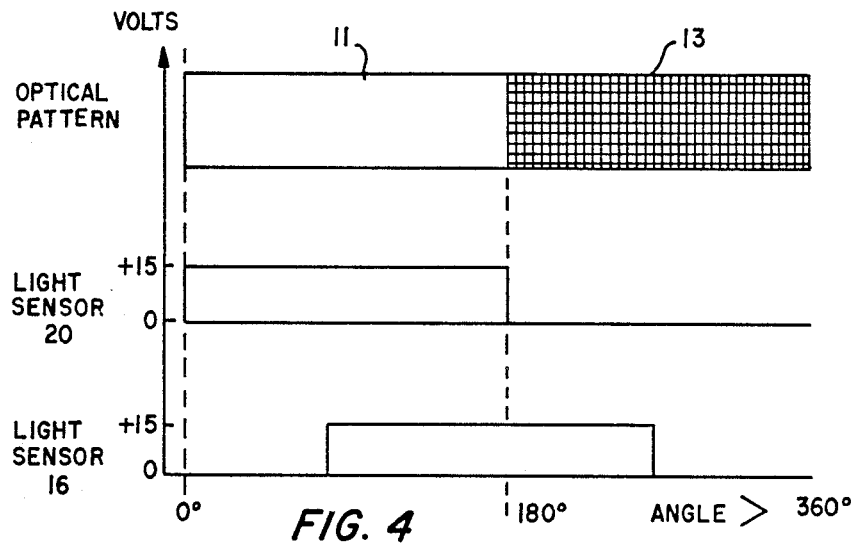
FIG. 4 is a diagram showing the optical pattern on the rotor and the output of the two detectors.

Referring now to FIGS. 3 and 4 there is shown a rotor 12 rotatable in a clockwise direction having a reflective portion 11 and a non-reflective portion 13. Light sensors 16 and 20 are separated by 90°. The chart in FIG. 4 shows the optical pattern and the output of light sensors 16 and 20 for various angular positions of rotor 12.

Figure 5:
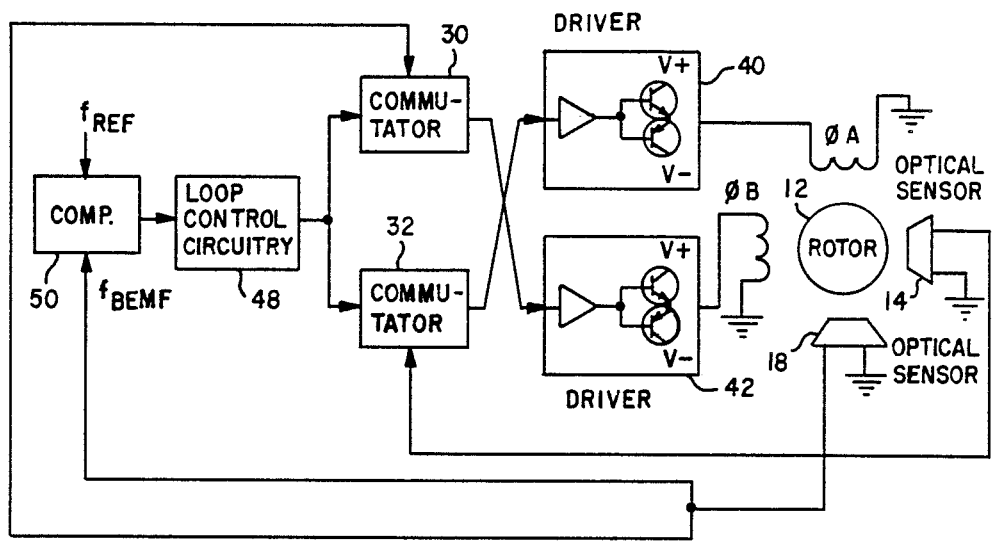
FIG. 5 is similar to FIG. 2 but utilizing a reference frequency for the speed command signal.

Referring now to FIG. 5 there is shown another embodiment of the invention which is similar to the embodiment shown in FIG. 2 but without the frequency to voltage converter 44. The embodiment of FIG. 5 utilizing a frequency comparator 50 which compares a speed command reference frequency with a back EMF frequency signal from optical sensor 13. The output of the frequency comparator 50 is fed to a loop control circuitry 48 and the rest of the circuitry function similar to the components described above with respect to FIG. 2.

The disclosed apparatus provides the pole location from rest, resulting in unambiguous polarity of rotation during starting. The disclosed optical commutation eliminates the need for complex start/restart electronics which may be utilized in other applications. A single mode of operation, two-phase drive, is obtained through a continuous closed loop drive, starting from rest. Both stator phases produce torque continuously for maximum torque capability and minimum run-up time. An internally generated DC speed command provides precision control eliminating the need for an external frequency reference.

What is claimed is:

1. Permanent magnet motor apparatus comprising:
a two pole permanent magnet rotor;
two phase stator windings, disposed for driving said permanent magnet rotor when energized;
an optical pattern consisting of a reflective segment and a non-reflective segment formed on said rotor;
two optical detectors spatially separated by 90° and disposed with respect to said permanent magnet rotor to sense said optical pattern;
drive circuit means responsive to said optical detector means for continuous two phase driving of said two phase stator windings to start and drive said permanent magnet rotor; and,
feedback means including a feedback circuit for closed loop operation and providing to said drive circuit means a velocity and position feedback signal derived from only one of said optical detectors.

2. Permanent magnet motor apparatus wherein said two optical detectors as claimed in claim 1 comprise:
a first light source directing light on to said rotor;
a first light sensor for sensing light from said first light source which is reflected from said rotor;
a second light source directing light on to said rotor; and
a second light sensor, separated from said first light sensor, for sensing light from said second light source which is reflected from said rotor.

3. A method of driving a motor having a permanent magnet rotor and two phase stator windings comprising the steps of:
(a) providing an optical pattern on the rotor;
(b) detecting at two different locations, separated by approximately 90°, the optical pattern;
(c) detecting the frequency with which the optical pattern rotates;
(d) converting the frequency detected in step (c), from only one of the two different locations, to a related DC voltage feedback signal;
(e) comparing the frequency converted feedback signal with a speed command signal to obtain an error signal; and
(f) driving both two phase stator windings in response to the error signal to start, accelerate and drive the rotor at a desired speed.

4. Motor drive apparatus comprising:
a permanent magnet two phase motor having a pair of stator windings and a permanent magnet rotor;
an optical pattern formed on said rotor with a reflective segment extending approximately 180 degrees around the spin axis of the permanent magnet rotor and a non-reflective segment extending the remainder of the way around the spin axis of the permanent magnet rotor;
a pair of optical detectors separated by approximately 90° circumferentially with respect to the spin axis but fixed with respect to said rotor, disposed to sense the position of the rotor by sensing said optical pattern;
a pair of commutator switches, one associated with each stator windings and operable sequentially in response to signals from said pair of optical detectors to start and drive said rotor;
a speed command signal;
a feedback signal means providing a feedback signal derived from one of said optical detectors which is a function of rotor speed; and
comparator means for comparing said speed command signal and said feedback speed signal and providing an output signal which controls speed of rotation of said rotor.

5. Apparatus as claimed in claim 4 wherein:
said speed command signal and said feedback speed signal are AC voltages.

6. Apparatus as claimed in claim 4 wherein:
said speed command signal and said feedback speed signal are DC signals whose frequency is related to rotor speed.

7. A drive for a gyroscopic instrument having a two phase motor with a permanent magnet rotor comprising:
a two phase stator having only two windings;

an optical pattern formed on said permanent magnet rotor with a reflective segment extending approximately 180 degrees around the spin axis of the permanent magnet rotor and a non-reflective segment extending the remainder of the way around the spin axis of the permanent magnet rotor;

an optical detector associated with each winding disposed to detect said optical pattern and the relative position of said rotor;

drive means connected to receive the output signal from said detectors for driving the two stator windings to start and continuously drive the rotor for two phase operation;

a speed command signal;

feedback means connected to one of said detectors for providing a feedback speed signal; and comparator means for comparing a speed command signal and the feedback speed signal and providing an output error signal which is utilized for energizing the stator windings to drive the rotor at the commanded speed.

* * * * *